(12) United States Patent
Liu et al.

(10) Patent No.: US 7,913,267 B2
(45) Date of Patent: Mar. 22, 2011

(54) INFORMATION STORAGE DISK HANDLING APPARATUS

(75) Inventors: Ming-Hsun Liu, Taipei (TW); Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 714 days.

(21) Appl. No.: 11/746,645

(22) Filed: May 10, 2007

(65) Prior Publication Data
US 2008/0282273 A1 Nov. 13, 2008

(51) Int. Cl.
*G11B 7/00* (2006.01)
*G11B 17/04* (2006.01)

(52) U.S. Cl. ...................................... 720/668; 369/200

(58) Field of Classification Search .................. 369/199, 369/200; 720/615, 668; 901/14, 31
See application file for complete search history.

(56) References Cited

U.S. PATENT DOCUMENTS

| | | | | | |
|---|---|---|---|---|---|
| 2,348,506 | A | * | 5/1944 | Weaver | 369/200 |
| 2,492,874 | A | * | 12/1949 | Matarazzo | 369/200 |
| 3,951,271 | A | * | 4/1976 | Mette | 414/591 |
| 6,141,298 | A | * | 10/2000 | Miller | 369/30.33 |
| 6,208,612 | B1 | * | 3/2001 | Miller | 369/30.19 |
| 6,222,800 | B1 | * | 4/2001 | Miller et al. | 369/30.19 |
| 6,285,648 | B1 | * | 9/2001 | Philipps | 369/200 |
| 2001/0009534 | A1 | * | 7/2001 | Sato | 369/34 |

* cited by examiner

*Primary Examiner* — Brian E Miller
*Assistant Examiner* — Adam B Dravininkas
(74) *Attorney, Agent, or Firm* — Pai Patent & Trademark Law Firm; Chao-Chang David Pai

(57) ABSTRACT

An information storage disk handling apparatus includes a first disk device, a second disk device and a turn-over device. The first disk device has a first tray, and the second disk device has a second tray. The first disk device is mounted over the second disk device. Each of the trays has an ejected position. The turn-over device is mounted between the ejected positions of the trays of the first disk device and the second disk device to turn over an optical disk removed from the first tray at its ejected position and received by the second tray at its ejected position after the optical disk is turned.

4 Claims, 11 Drawing Sheets

INFORMATION STORAGE DISK HANDLING APPARATUS

BACKGROUND

1. Field of the Invention

The present invention relates to a handling apparatus for information storage disks. More particularly, the present invention relates to a handling apparatus that turns over a disk removed from a first tray, and places the disk down onto a second tray after the disk is turned over.

2. Description of Related Art

Information storage disks such as compact disks need a variety of procedures to process. Those procedures include writing, reading, printing a cover etc. When handing the compact disk, there is a need to process respectively different or identical procedures on both sides of the disk. For example, both sides of the disk are respectively processed with two burning procedures, with a burning procedure and a printing cover procedure, with a reading procedure and a printing cover procedure etc.

Since different procedures need specific devices such as a disk drive, a disk printer, a burner etc. to handle and complete the necessary tasks, a turn-over mechanism for the disk is needed after the first side of the disk has been processed by a first processing device to turn the disk over and place the disk onto the tray of a second processing device.

The conventional manual method requires human operators to turn over the disk so as to enable the other side of the disk upturned. Thus, the next procedure can be executed on the upturned side of the disk. However, manual operations are inconvenient and unfavorable to automatic disk handling apparatus.

Therefore, there is a need to provide an improved disk handling apparatus for information storage disks to mitigate or obviate the aforementioned problems.

SUMMARY

An object of the present invention is to provide a handling apparatus for information storage disks. The handling apparatus performs the task of turning over a disk between stacked disk devices where the disk devices are located up and down and the turned disk is placed onto a tray of the lower disk device.

A handling apparatus in accordance with the present invention comprises a first disk device, a second disk device and a turn-over device. The first disk device comprises a first tray. The first tray has an ejected position. The second disk device is mounted under the first disk device and comprises a second tray. The second tray has an ejected position.

The turn-over device is mounted between the ejected positions of the first tray and the second tray to turn over (i.e. turning about 180 degrees) a disk removed from the first tray at its ejected position where the turned disk is received by the second tray at its ejected position.

In an embodiment in accordance with the present invention, the turn-over device comprises a driving device and a disk-taking device. The driving device connects to the disk-taking device. The disk-taking device is movably mounted between the ejected positions of the first tray and the second tray to remove a disk from the first tray at its ejected position and place the disk onto the second tray at its ejected position after the driving device drives the disk-taking device to turn over the disk (i.e. turning about 180 degrees).

In an embodiment in accordance with the present invention, the turn-over device comprises a guiding device. The guiding device receives and guides a disk pulled by gravity to fall from the ejected position of the first tray, turns over (i.e. turning about 180 degrees) the disk and places the disk onto the second tray at its ejected position.

The present invention has some advantages and effects as follows.

The handling apparatus receives a disk from the first disk device, turns over the disk and places the disk onto the second disk device. Manual operations to turn over the disk are not needed. Both sides of the disk can be processed with different procedures. The handling apparatus improves convenience of use and meets the demands of automatic processing procedures for handling information storage disks.

BRIEF DESCRIPTION OF THE DRAWINGS

These and other features, aspects, and advantages of the present invention will become better understood with regard to the following description, appended claims, and accompanying drawings where:

FIG. 4b is a side elevation view of the disk handling apparatus in FIG. 4a;

FIG. 5b is an operational and side elevation view of the disk handling apparatus in FIG. 5a;

DESCRIPTION OF THE PREFERRED EMBODIMENTS

Figure 1:
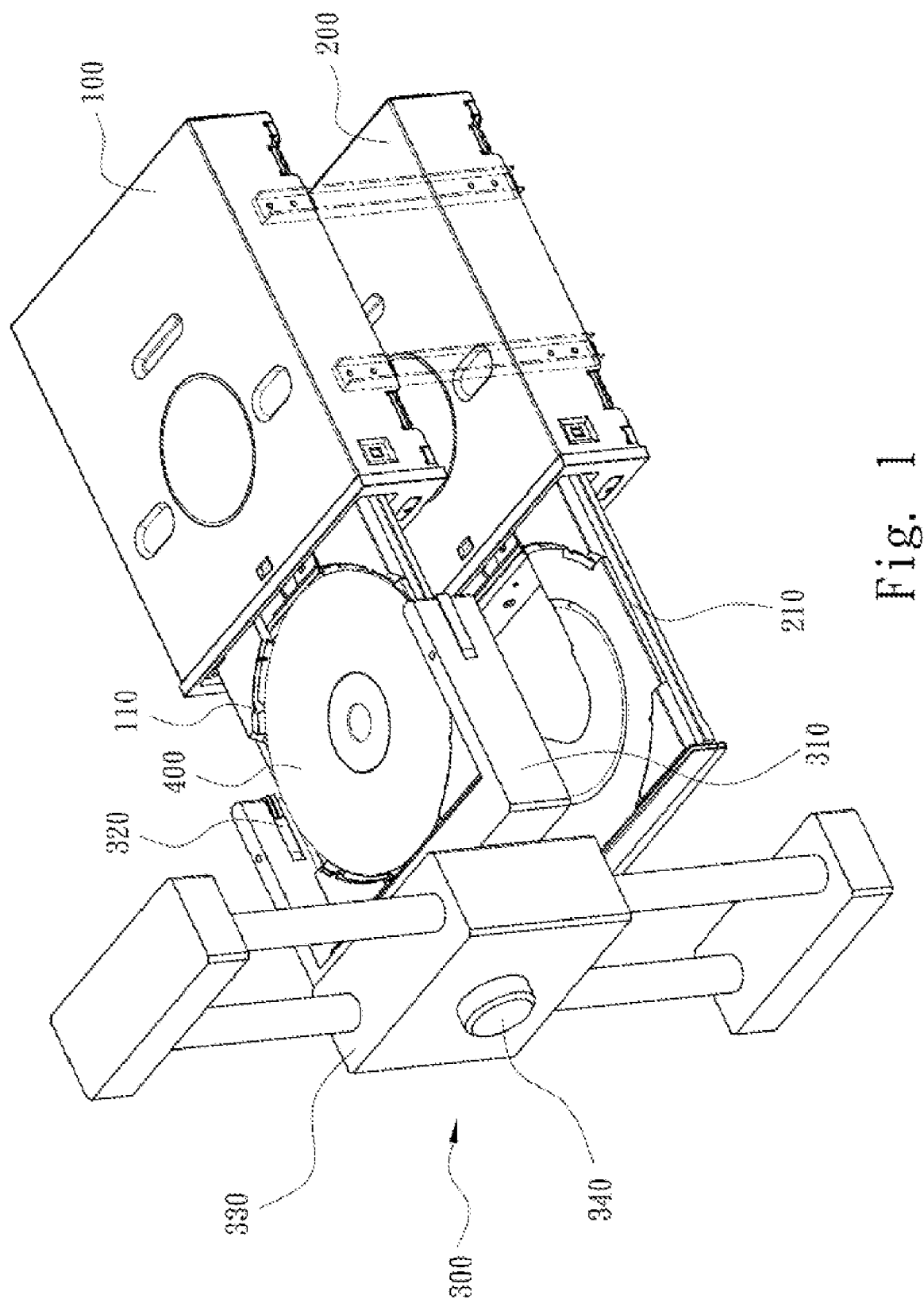
FIG. 1 is a perspective view of a first embodiment of a disk handling apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

An embodiment of a disk handling apparatus for information storage disks comprises a first disk device, a second disk device and a turn-over device. The first disk device comprises a first tray with an ejected position. Likewise, the second disk device comprises a second tray with an ejected position. The second disk device is mounted under the first disk device where the first tray and the second tray are aligned at their ejected positions. Arrangement between the first disk device and the second device only requires one disk device to be at the top and the second disk device to be at the bottom. However, the positional relationship between the two disk devices can be adjusted according to the practical demands of the user.

The turn-over device is mounted between the ejected positions of the trays of the disk devices to turn over (about 180 degrees) a disk released from the first tray at its ejected position, and the disk is received by the second tray at its ejected position after the disk is turned.

Figure 2:
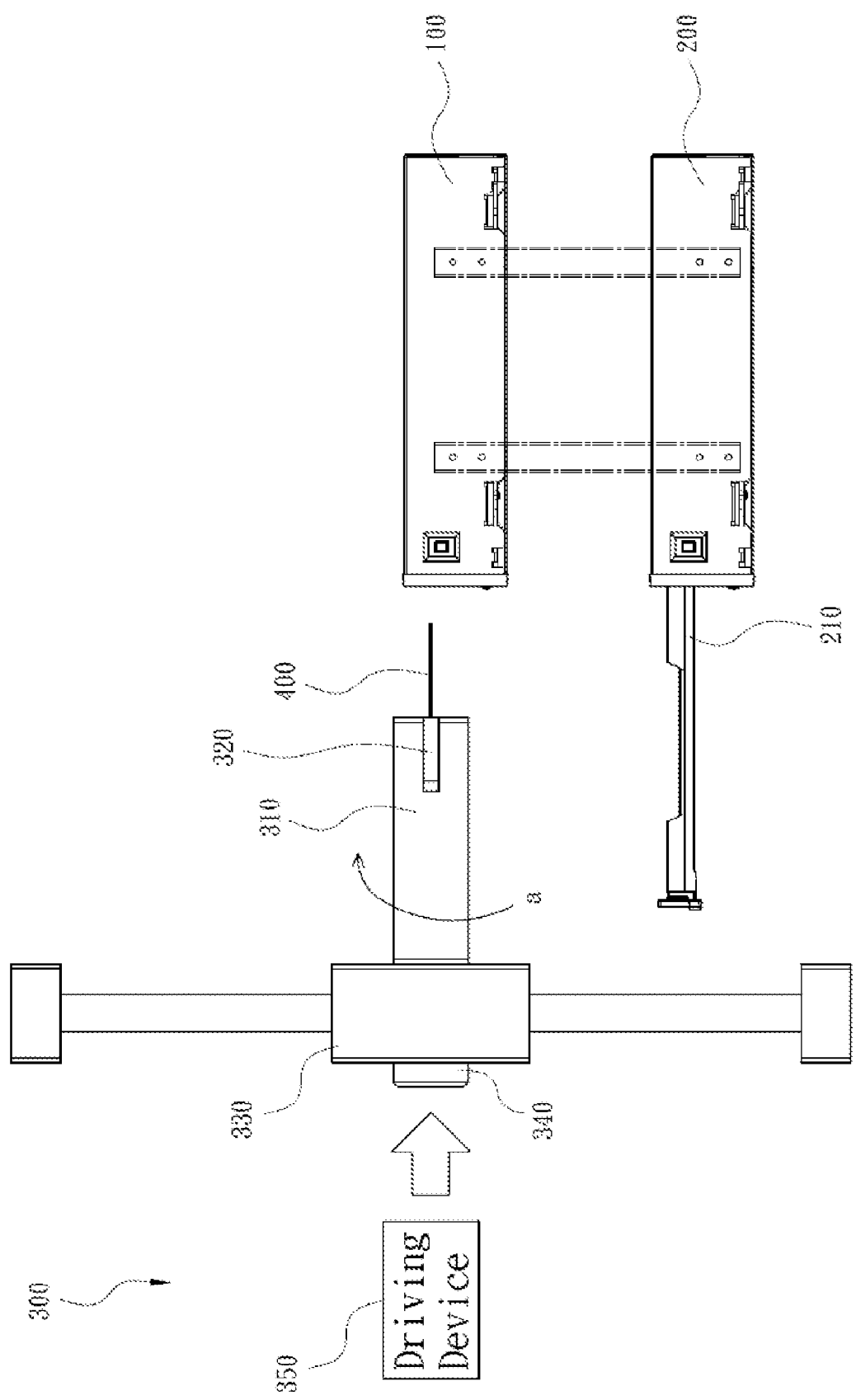
FIG. 2 is a side elevation view of the disk handling apparatus in FIG. 1.

With reference to FIG. 1 and FIG. 2, an embodiment of a disk handling apparatus 10 comprises a first disk device 100, a second disk device 200 and a turn-over device 300.

The first disk device 100 may be a compact disk drive, a disk burner, a disk printer etc. and comprises a first tray 110. The first tray 110 has an ejected position. Likewise, the second disk device 200 may be a compact disk drive, a disk burner, a disk printer etc. and comprises a second tray 210. The second tray 210 has an ejected position. The second disk device 200 is mounted under the first disk device 100. In the embodiment, the first disk device 100 and the second disk device 200 are stacked in parallel. The first tray 110 is aligned with the second tray 210 at their ejected positions. The turn-over device 300 comprises a disk-taking device 310, a slide 330, a hinge 340, and a driving device 350. The disk-taking device 310 is movably mounted between the ejected positions of the trays 110,210 and comprises two grippers 320. The slide 330 transports the disk-taking device 310 from the ejected position of the first tray 110 to the ejected position of the second tray 210. The hinge 340 connects the disk-taking device 310 to the slide 330 for allowing the disk-taking device 310 to rotate about the longitudinal axis of the disk-taking device 310. The longitudinal axis of the disk-taking device 310 is an axis passing through the disk 400 and the hinge 340. Therefore, the disk-taking device 310 is rotated along with the arrow a shown in FIG. 2. The driving device 350 is connected to the disk-taking device 310 to move and rotate the disk-taking device 310. In detail, the driving device 350 drives the slide 330 to move the disk-taking device 310, and drives the hinge 340 to rotate the disk-taking device 310.

When the processing procedure such as reading, writing, printing etc. on the first side of the disk 400 in the first disk device 100 is completed, the first tray 110 with the disk 400 is ejected to its ejected position. Meanwhile, the driving device raises the disk-taking device 310 to enable the grippers 320 to take the disk 400 and remove the disk 400 from the first tray 110. The first tray 110 is retracted into the first disk device 100 while the second tray 210 is ejected to its ejected position. The driving device turns over the disk 400 about 180 degrees to enable the second side of the disk 400 to face upward. The driving device moves down the disk-taking device 310 to place the disk 400 on the second tray 210 so that the second tray 210 with the disk 400 is retracted into the second disk device 200 to perform the next processing procedure such as reading, writing, printing etc. on the second side of the disk 400.

Figure 3:
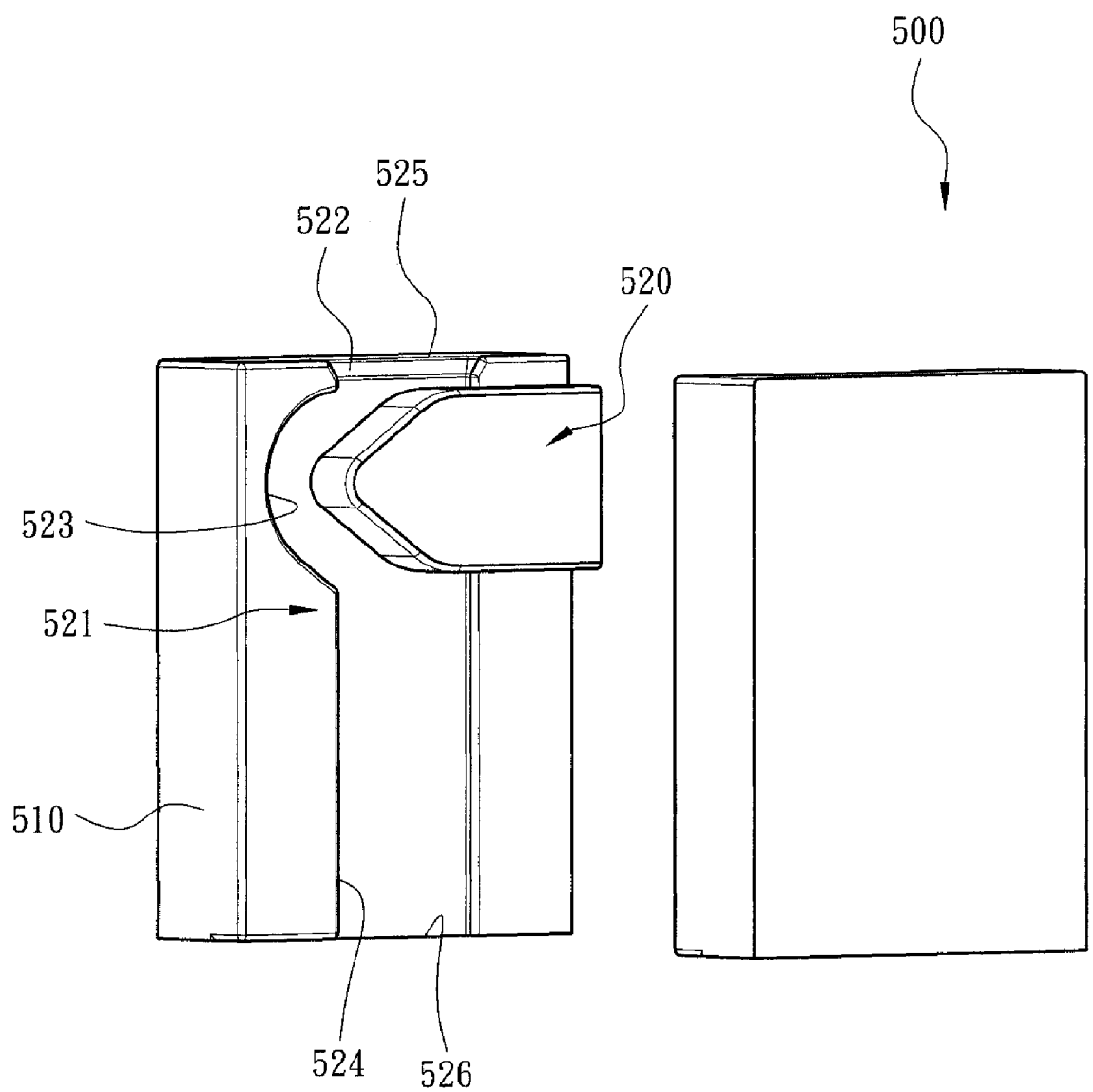
FIG. 3 is a perspective view of a guiding device of a second embodiment of a disk handling apparatus in accordance with the present invention.
Figure 4A:
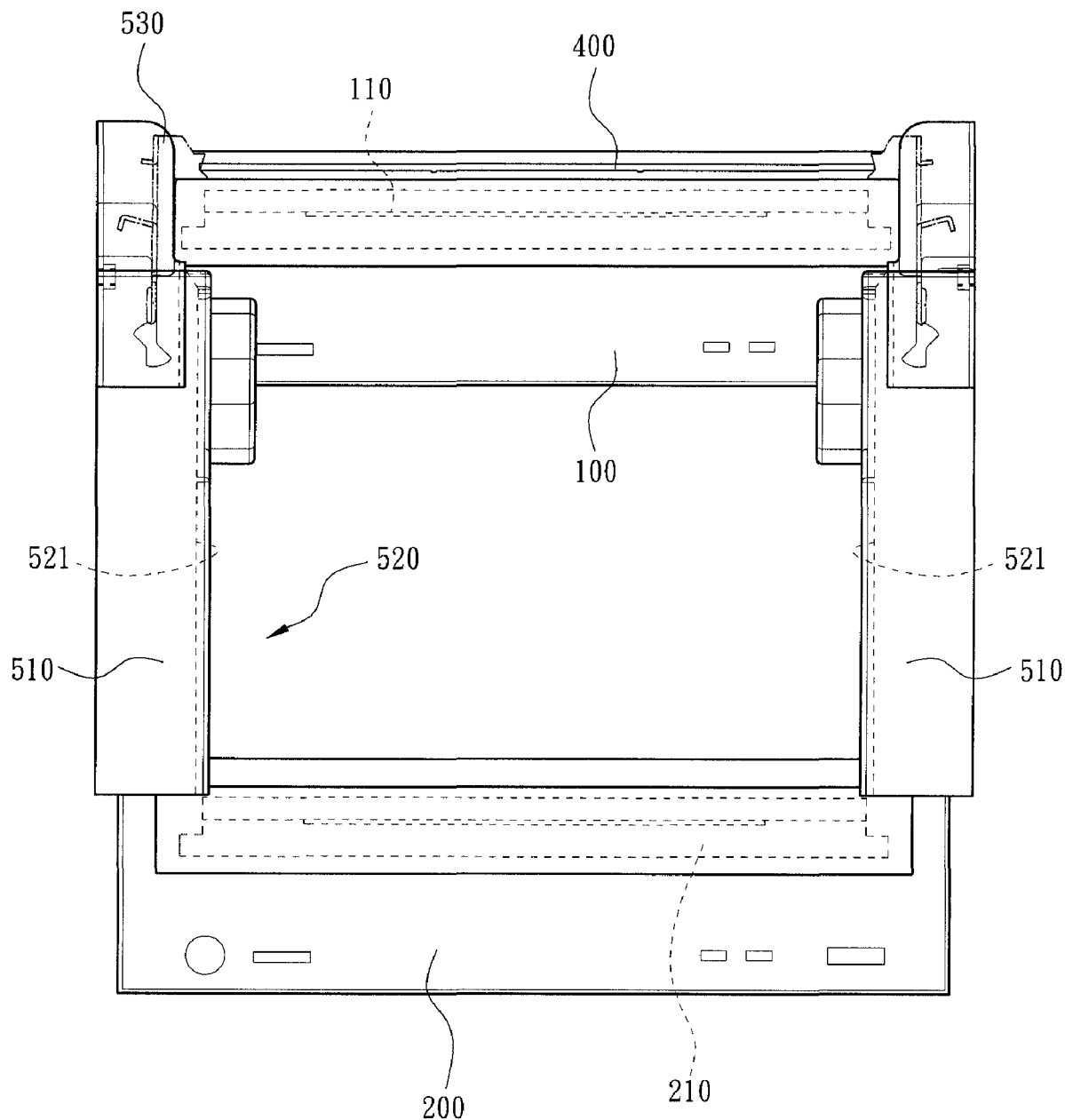
FIG. 4a is a front view of the disk handling apparatus of the second embodiment.
Figure 4B:
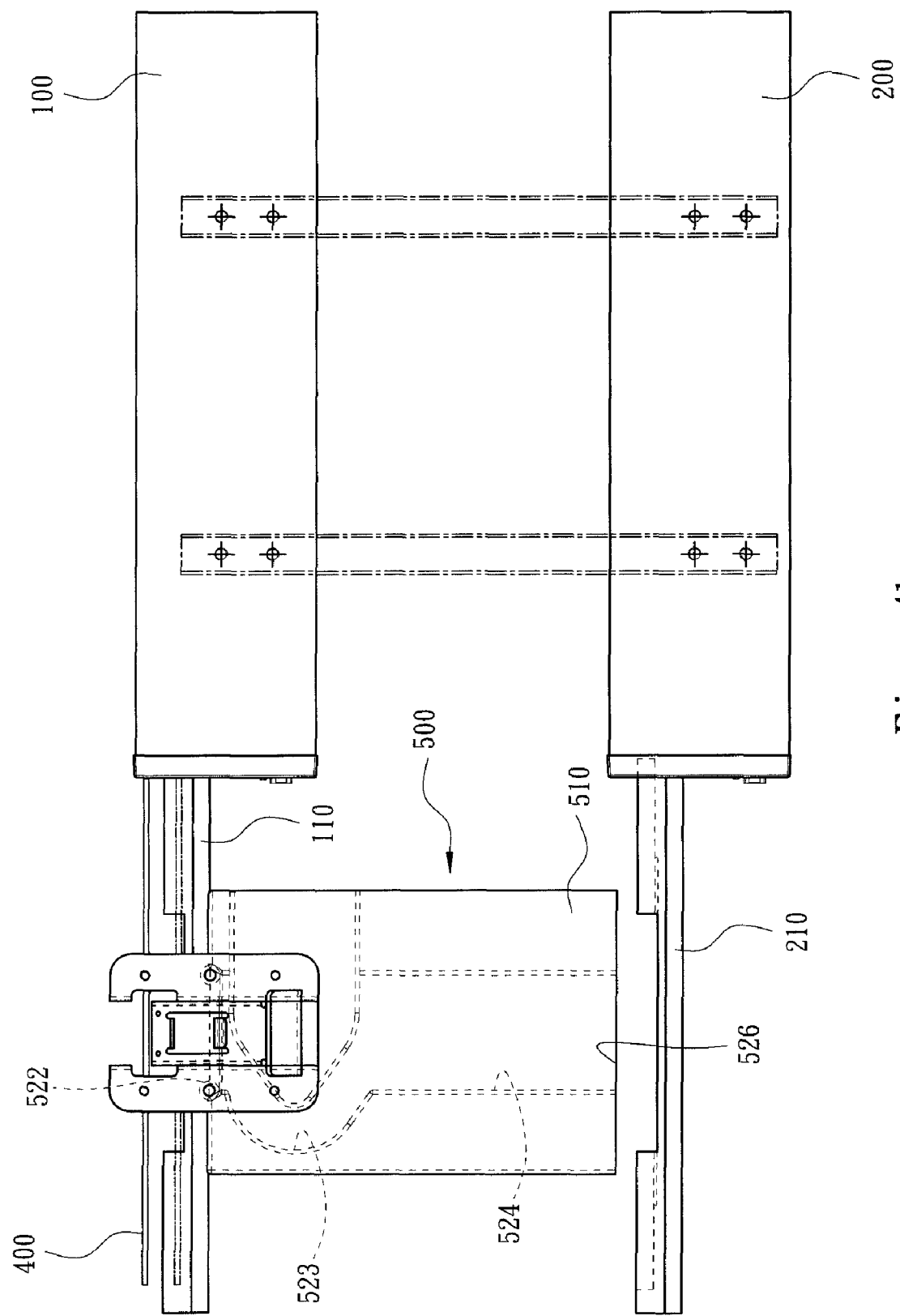

Refer to FIG. 3 and FIG. 4a and FIG. 4b. A second embodiment of a disk handling device comprises a first disk device 100, a second disk device 200 and a turn-over device 500.

The turn-over device 500 is mounted between the ejected positions of the first tray 110 and the second tray 210 and comprises two guiding blocks 510 and a guiding device 520. The guiding blocks 510 are arranged corresponding to each other. The guiding device 520 is mounted in the guiding blocks 510 and comprises two guiding grooves 521. The guiding grooves 521 are respectively defined in the guiding blocks 510. The guiding grooves 521 are arranged symmetrically and correspond to each other. Each guiding groove 521 has an entrance section 522, a turn-over section 523 and an outlet section 524 that are arranged sequentially in the direction of gravity. The entrance section 522 has an inlet 525. The turn-over section 523 is a semicircular passage with about 180 degrees. The outlet section 524 has an outlet 526 and is extended along the direction of gravity.

Figure 5A:
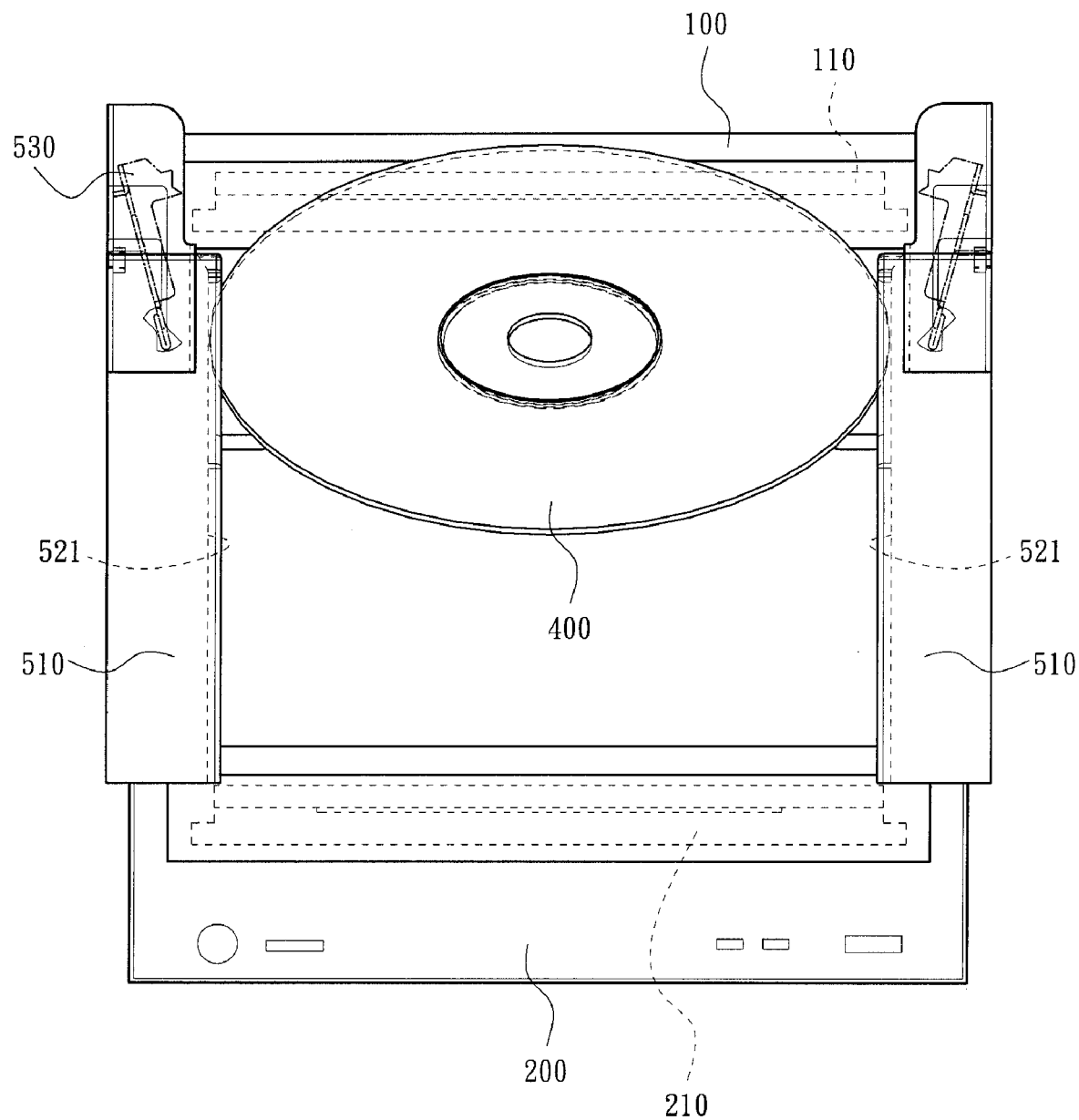
FIG. 5a is an operational front view of the disk handling apparatus in FIG. 4a when a disk is turned over by the guiding device.
Figure 5B:
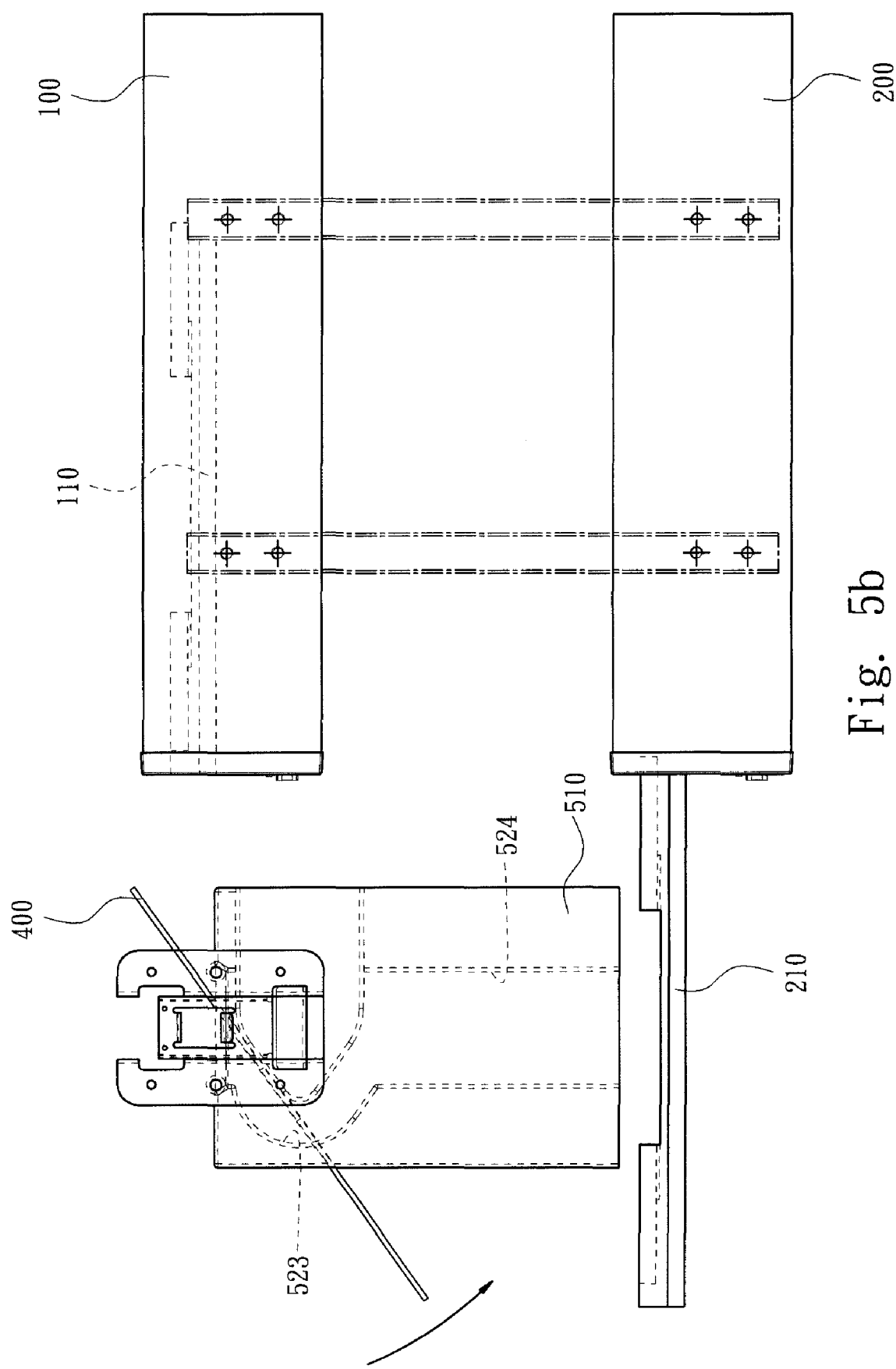
Figure 6:
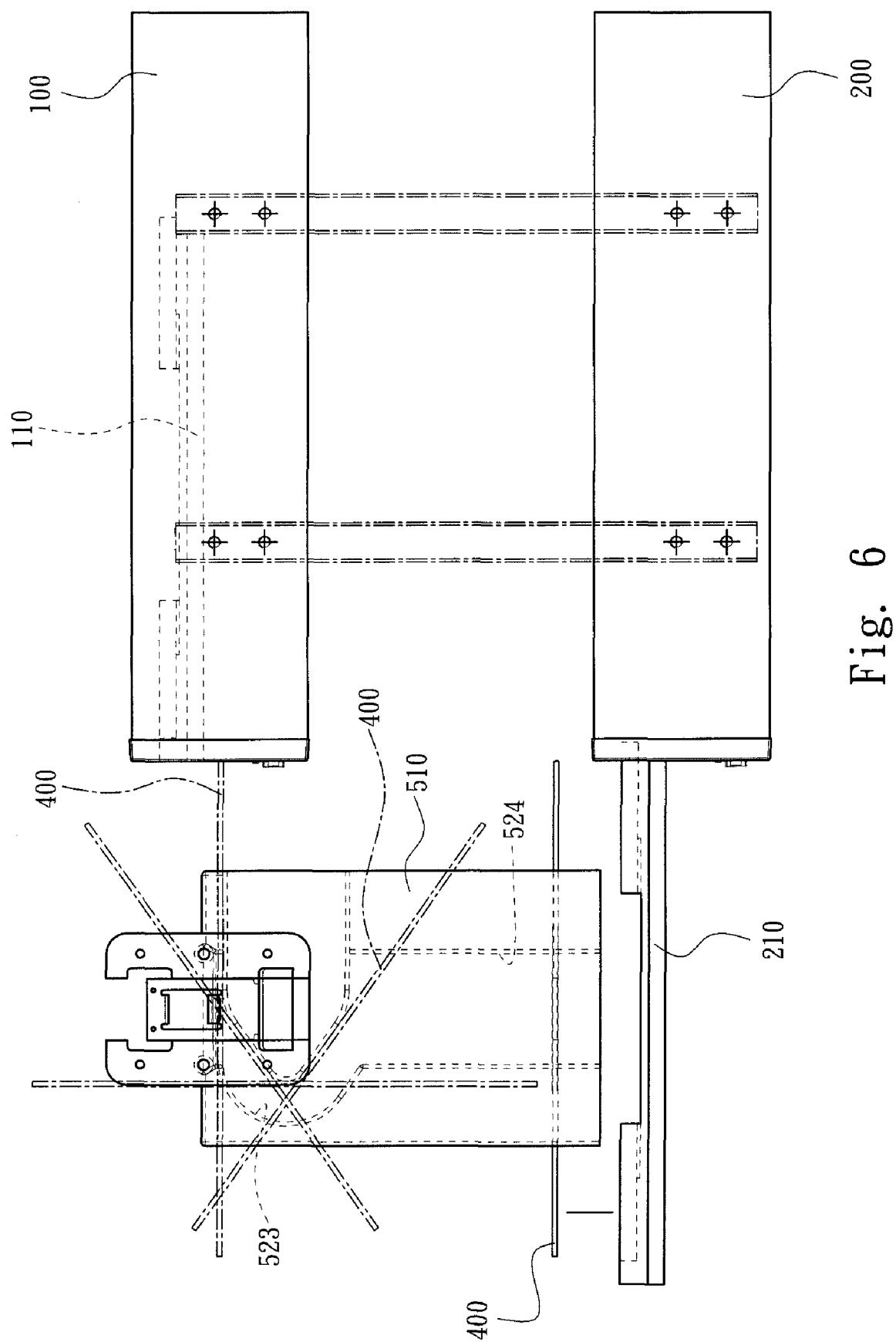
FIG. 6 is an operational and side elevation view of the disk handling apparatus in FIG. 5a illustrating the guiding device turns over the disk.

Further refer to FIG. 5a, FIG. 5b and FIG. 6. When the processing procedure such as reading, writing, printing etc. on the first side of the disk 400 in the first disk device 100 is completed, the first tray 110 with the disk 400 is ejected to its ejected position. Meanwhile, using two gripping pawls 530 takes, raises and removes the disk 400 from the first tray 110 as shown in FIG. 4a. The first tray 110 is retracted into the first disk device 100 while the second tray 210 is ejected to its ejected position. The gripping pawls 530 move the disk 400 downward until the gripping pawls 522 are kept in an inclined state to open and release the disk 400 as shown in FIG. 5a. The disk 400 is pulled down by gravity to enter the entrance sections 522 through the inlets 525 as shown in FIG. 5b. Gravity continuously acts on the disk 400 to enable the disk 400 to move along the guiding grooves 521. When the disk 400 passes through the turn-over sections 523, the disk 400 is turned about 180 degrees so that the second side of the disk 400 is upward and eventually enters the outlet sections 524. The disk 400 moves along the direction of the outlet sections 524 i.e. the direction of gravity, leaves the outlet sections 524 through the outlets 526 and is eventually placed onto the second tray 210 at its ejected position as shown in FIG. 6 where the second disk device 200 can perform the next processing procedure, such as printing, writing, reading et., on the second side of the disk 400.

Figure 7:
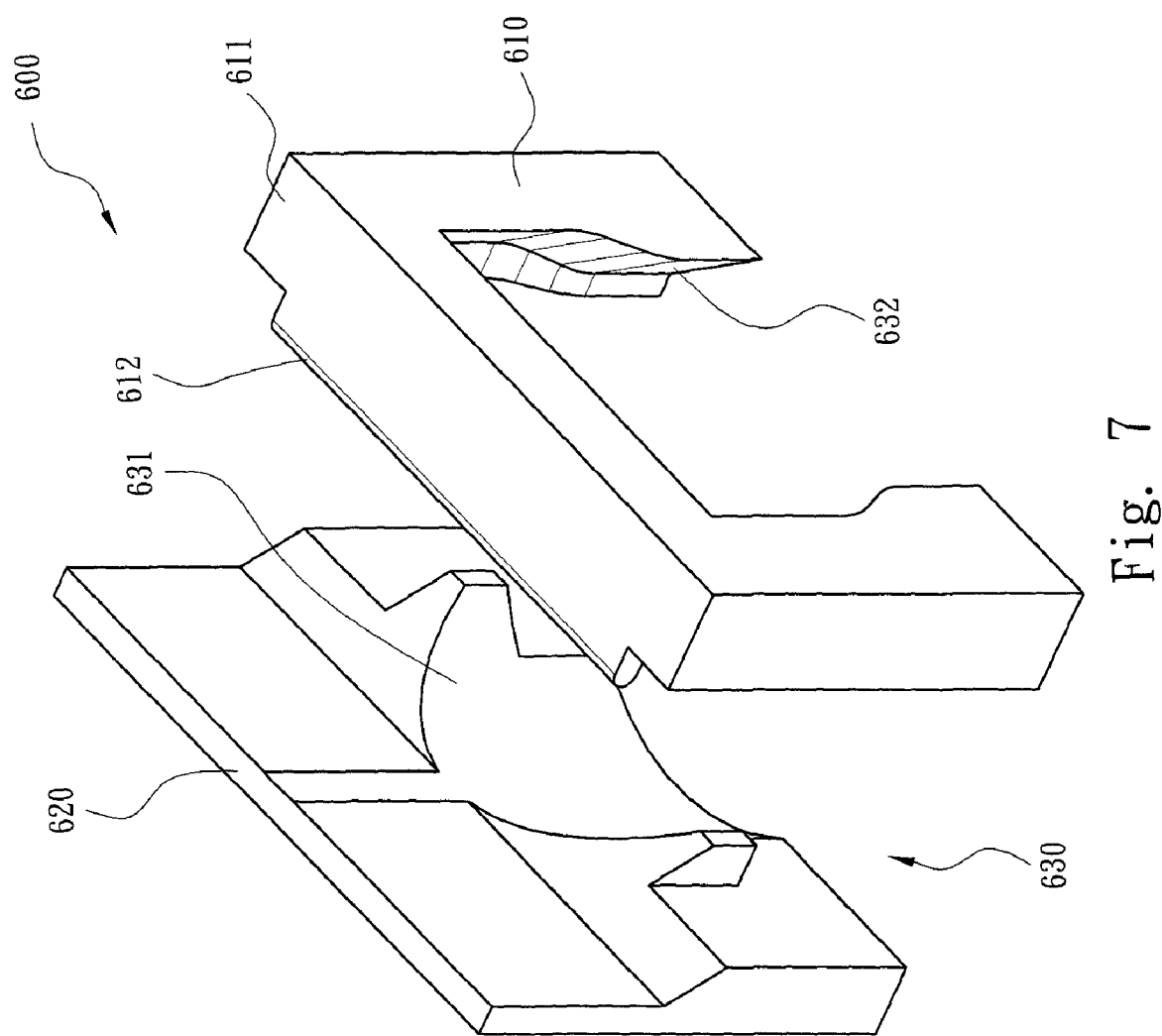
FIG. 7 is a perspective view of a guiding device of a third embodiment of a disk handling apparatus in accordance with the present invention.
Figure 8:
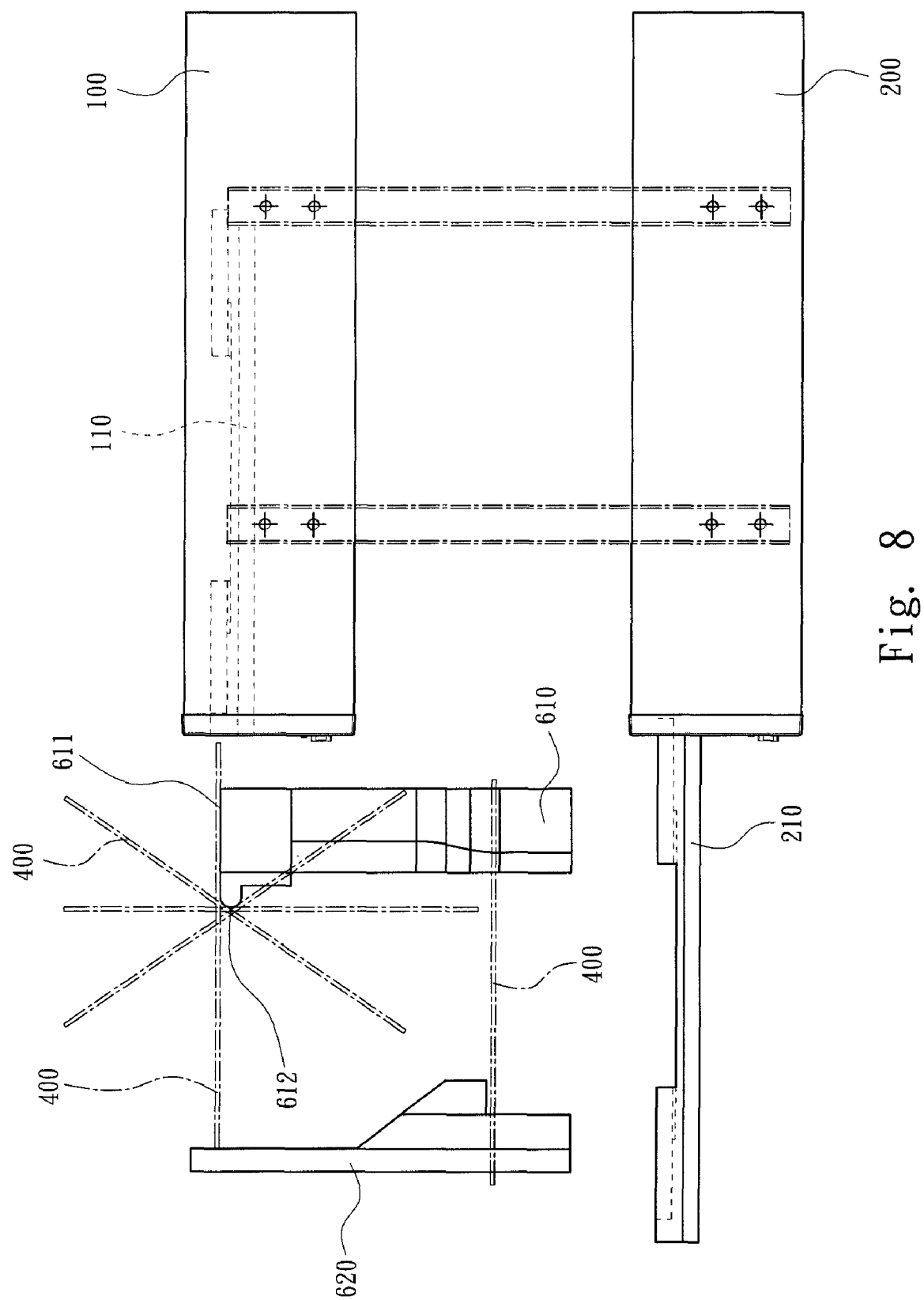
FIG. 8 is an operational and side elevation view of a disk handling apparatus with the guiding device in FIG. 7 to illustrate the guiding device turns over the disk.

Refer to FIG. 7 and FIG. 8. A third embodiment of a disk handling device comprises a first disk device 100, a second disk device 200 and a turn-over device 600. The turn-over device 600 is mounted between the ejected positions of the trays 110,210 and comprises a first guiding block 610, a second guiding block 620 and a guiding device 630. The first guiding block 610 and the second guiding block 620 are arranged corresponding to each other. The first guiding block 610 is mounted at a location adjacent to the first disk device 100 and the second disk device 200, and comprises a loading platform 611.

The guiding device 630 is mounted in the guiding blocks 610,620 and comprises a guiding recess 631 and a dodging recess 632. The guiding recess 631 is defined in a side of the second guiding block 620 facing the first guiding block 610. The dodging recess 632 is defined in the first guiding block 610 associated with the guiding recess 631.

The loading platform 611 of the first guiding block 610 has a guiding edge 612. When the disk is loaded on the loading platform 611, the center of gravity of the disk 400 is located outside the guiding edge 612.

When the first side of the disk 400 has been accomplished with its processing procedure such as reading, writing, printing etc. in the first disk device 100, the first tray 110 with the disk 400 is ejected to its ejected position. Meanwhile, using two gripping pawls remove the disk 400 from the first tray 110 and load the disk 400 on the loading platform 611 as previously described. Since the center of gravity (i.e. the center hole) of the disk 400 is located outside the guiding edge 612, gravity pulls the disk 400 to fall where the disk 400 is turned over about 180 degrees relative to the guiding edge 612. The disk 400 falls down and is eventually placed on the second tray 210. The guiding recess 631 provides positioning and guiding functions to the disk 400 as the disk 400 falls. The dodging recess 632 provides space to the disk 400 as the disk 400 is turned. When the disk 400 is placed onto the second tray 210 at its ejected position, the second disk device 200 can perform the next processing procedure, such as printing, writing, reading et., on the second side of the disk 400.

Figure 9:
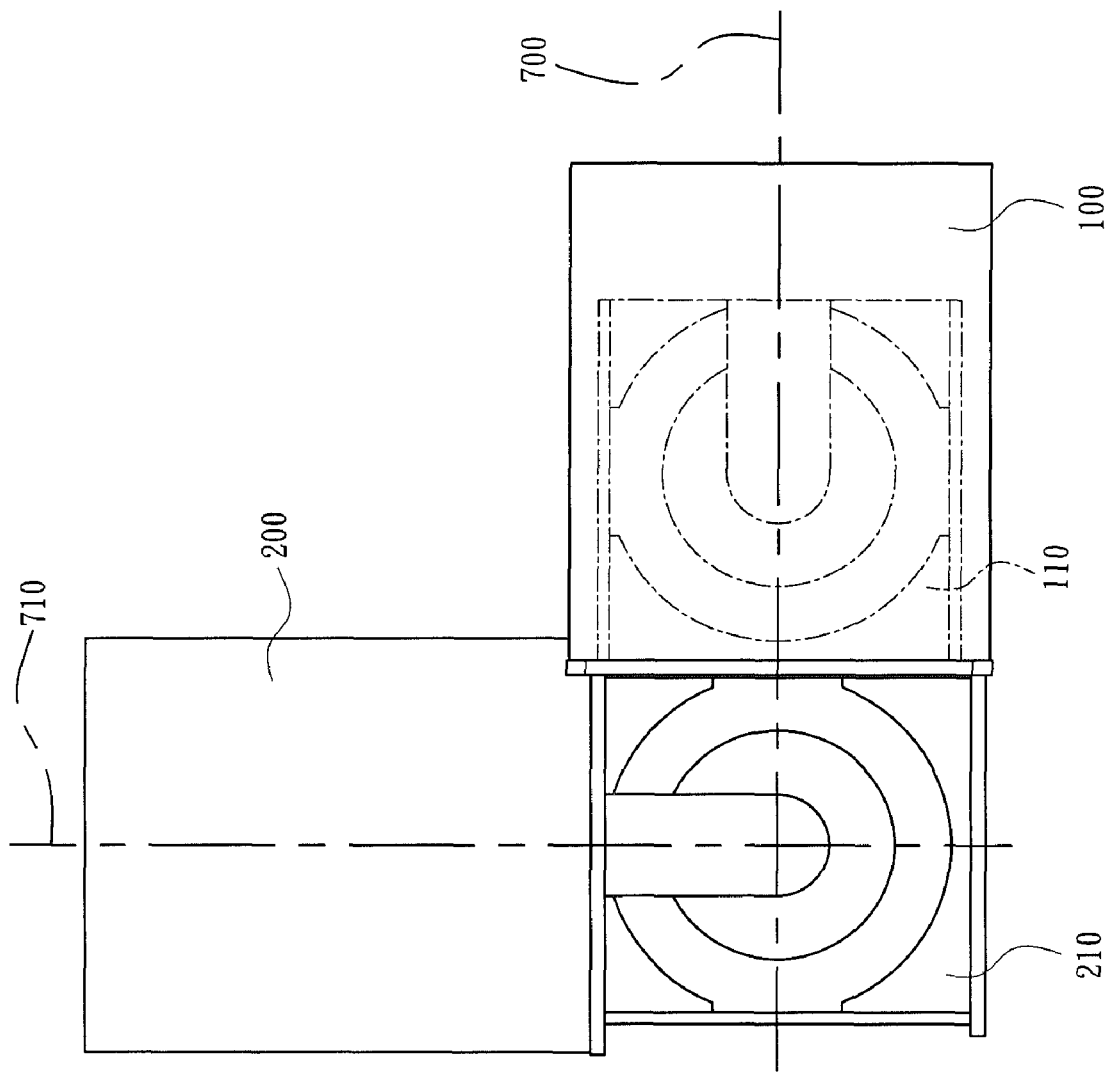
FIG. 9 is a top view of a fourth embodiment of a disk handling apparatus in accordance with the present invention.

Refer to FIG. 9. A fourth embodiment of the disk handling apparatus rearranges the first disk device 100 and the second disk device 200. The first disk device 100 and the second disk device 200 are respectively positioned along a first axis 700 and a second axis 710. The first axis 700 and the second axis 710 have an included angle about 90 degrees.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handling apparatus for information storage disks, the handling apparatus comprising:
    a first disk device comprising a first tray, the first tray having an ejected position;
    a second disk device mounted under the first disk device and comprising a second tray, the second tray having an ejected position;
    a disk-taking device comprising two grippers, wherein the two grippers are opposite to each other for taking a disk from two opposite edges of the disk;
    a slide for transporting the disk-taking device from the ejected position of the first tray to the ejected position of the second tray; and
    a hinge connecting the disk-taking device to the slide for allowing the disk-taking device to rotate about an axis passing through the disk and the hinge.

2. The handling apparatus as claimed in claim 1, wherein the first disk device is one of a compact disk drive, a burner and a disk printer, and the second disk device is one of a compact disk drive, a disk burner and a disk printer.

3. A handling apparatus for information storage disks, the handling apparatus comprising:
    a first disk device comprising a first tray, the first tray having an ejected position;
    a second disk device mounted under the first disk device and comprising a second tray, the second tray having an ejected position; and
    a turn-over device comprising:
        a disk-taking device comprising two grippers, wherein the two grippers are opposite to each other for taking a disk from two opposite edges of the disk;
        a slide for transporting the disk-taking device from the ejected position of the first tray to the ejected position of the second tray;
        a hinge connected the disk-taking device to the slide for allowing the disk-taking device to rotate about a longitudinal axis of the disk-taking device; and
        a driving device for driving the hinge and the slide.

4. The handling apparatus as claimed in claim 3, wherein the first disk device is one of a compact disk drive, a burner and a disk printer, and the second disk device is one of a compact disk drive, a disk burner and a disk printer.

* * * * *